(12) United States Patent
Weston

(10) Patent No.: US 10,000,100 B2
(45) Date of Patent: Jun. 19, 2018

(54) PIEZOELECTRIC BASED SYSTEM AND METHOD FOR DETERMINING TIRE LOAD

(75) Inventor: David Alan Weston, Hendersonville, NC (US)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 288 days.

(21) Appl. No.: 13/977,418

(22) PCT Filed: Dec. 30, 2010

(86) PCT No.: PCT/US2010/062519
§ 371 (c)(1),
(2), (4) Date: Jun. 28, 2013

(87) PCT Pub. No.: WO2012/091719
PCT Pub. Date: Jul. 5, 2012

(65) Prior Publication Data
US 2013/0278406 A1      Oct. 24, 2013

(51) Int. Cl.
*B60C 23/06*      (2006.01)
*B60C 23/04*      (2006.01)

(52) U.S. Cl.
CPC ........ *B60C 23/064* (2013.01); *B60C 23/0488* (2013.01); *B60C 23/0489* (2013.01); *B60C 23/0493* (2013.01)

(58) Field of Classification Search
CPC combination set(s) only.
See application file for complete search history.

(56) References Cited

U.S. PATENT DOCUMENTS

| 4,364,267 | A |   | 12/1982 | Love |
| 4,504,761 | A | * | 3/1985 | Triplett ............... H02N 2/18 290/1 R |
| 5,247,831 | A | * | 9/1993 | Fioravanti ........... B60C 11/0332 706/905 |

(Continued)

FOREIGN PATENT DOCUMENTS

| DE | 10329700 | 1/2005 |
| EP | 0887211 | 12/1998 |

(Continued)

OTHER PUBLICATIONS

International Search Report, PCT/US2010/062519, dated Mar. 10, 2011.

(Continued)

*Primary Examiner* — Brian Zimmerman
*Assistant Examiner* — Cal Eustaquio
(74) *Attorney, Agent, or Firm* — Dority & Manning, P.A.

(57) ABSTRACT

Systems and methods of determining tire load from measured tire parameters include using a piezoelectric based sensor to obtain one or more contact patch parameters (e.g., contact patch entry time, contact patch exit time total contact patch time and contact patch angle) and one or more additional sensors to obtain tire pressure. Selected contact patch parameter measurements and pressure values are then compared with known combinations of contact patch parameter values and pressure values stored in a look-up table. A corresponding determined tire load value is then provided as electronic output.

14 Claims, 4 Drawing Sheets

(56) References Cited

U.S. PATENT DOCUMENTS

| | | | |
|---|---|---|---|
| 5,749,984 A * | 5/1998 | Frey et al. | 152/415 |
| 6,417,764 B2 * | 7/2002 | Tonkin | B60Q 1/444 |
| | | | 180/282 |
| 6,539,295 B1 | 3/2003 | Katzen | |
| 6,880,394 B2 | 4/2005 | Boulot | |
| 6,917,285 B2 | 7/2005 | Boulot | |
| 6,959,593 B2 | 11/2005 | Mancosu | |
| 6,980,925 B2 | 12/2005 | Zheng | |
| 7,000,462 B2 | 2/2006 | Hillenmayer | |
| 7,343,787 B2 | 3/2008 | Oflaz | |
| 7,404,317 B2 | 7/2008 | Mancosu | |
| 7,661,300 B2 | 2/2010 | Sinnett | |
| 2002/0092364 A1 * | 7/2002 | Adderton et al. | 73/862.41 |
| 2003/0058118 A1 | 3/2003 | Wilson | |
| 2003/0201044 A1 | 10/2003 | Schick | |
| 2003/0209063 A1 * | 11/2003 | Adamson et al. | 73/146 |
| 2005/0075825 A1 * | 4/2005 | Zheng | B60C 23/0488 |
| | | | 702/140 |
| 2005/0097949 A1 | 5/2005 | Hillenmayer et al. | |
| 2006/0224344 A1 * | 10/2006 | Orita et al. | 702/98 |
| 2007/0010928 A1 | 1/2007 | Brusarosco | |
| 2007/0171034 A1 | 7/2007 | Mancosu | |
| 2007/0240502 A1 | 10/2007 | Morinaga | |
| 2009/0055040 A1 | 2/2009 | Nagaya | |
| 2009/0171531 A1 | 7/2009 | Kitazaki et al. | |
| 2010/0147062 A1 * | 6/2010 | Wakao | B60C 11/0318 |
| | | | 73/146 |
| 2010/0191495 A1 * | 7/2010 | Drevo et al. | 702/98 |
| 2012/0167687 A1 * | 7/2012 | Wakao | B60C 11/0332 |
| | | | 73/579 |

FOREIGN PATENT DOCUMENTS

| | | |
|---|---|---|
| EP | 1991451 | 11/2008 |
| JP | H09-188113 | 7/1997 |
| JP | 2004/317443 | 11/2004 |
| JP | 2005/214744 | 8/2005 |
| JP | 2007/106324 | 4/2007 |
| JP | 2008/302848 | 12/2008 |
| WO | WO 2006098714 | 9/2006 |
| WO | WO 2006135366 | 12/2006 |
| WO | WO 2008/036088 | 3/2008 |
| WO | WO 2010024919 | 3/2010 |

OTHER PUBLICATIONS

European Search Report, PCT/US2010062519, dated Apr. 29, 2014, 6 pages.

* cited by examiner

PIEZOELECTRIC BASED SYSTEM AND METHOD FOR DETERMINING TIRE LOAD

FIELD OF THE INVENTION

The present subject matter generally relates to tire sensors and related tire electronics, and more particularly concerns a piezoelectric-based system and method for determining tire load.

BACKGROUND OF THE INVENTION

The incorporation of electronic devices with pneumatic tire structures yields many practical advantages. Tire electronics may include sensors and other components for obtaining information regarding various physical parameters of a tire, such as temperature, pressure, number of tire revolutions, vehicle speed, etc. Such performance information may become useful in tire monitoring and warning systems, and may have potential use as a part of a feedback system to regulate or control certain tire and/or vehicle related systems. Yet another potential capability offered by electronics systems integrated with tire structures corresponds to asset tracking and performance characterization for commercial vehicular applications.

Sensors using piezoelectric-based technology have been used in various tire embodiments for a variety of purposes. For example, piezoelectric elements have been used to generate power within a tire. Piezoelectric sensors have been used to function as a revolution counter within a tire. Piezoelectric sensors have even been used to determine deflection, acceleration and other parameters.

One important parameter of interest related to tire performance is the tire load, or the effective weight a tire is subjected to as it experiences forces from the vehicle and road during operation. Tire load is significant because it can affect the useful life of a tire. As such, it may be desirable to monitor tire load levels to make sure that a tire does not exceed its load ratings or maximum load capacity. In addition, tire load levels may be monitored to determine other features related to tire wear and the like.

Although many piezo-based tire sensors have been employed, a need remains for a robust and reliable piezo-based system and method for determining tire load. No design has emerged that generally encompasses all of the desired characteristics as hereafter presented in accordance with the subject technology.

SUMMARY OF THE INVENTION

In view of the recognized features encountered in the prior art and addressed by the present subject matter, improved technology has been developed to determine tire load from measured tire pressure and one or more measured or calculated contact patch parameters. In some embodiments, the contact patch parameters are determined from the signal output of one or more piezoelectric elements provided within a piezoelectric based sensor. In some embodiments, the determination of tire load is made by electronically comparing determined tire pressure and contact patch parameters to a look-up table of known values for a tire.

One exemplary embodiment of the present subject matter relates to a method of electronically determining tire load. Such method includes a first step of determining tire pressure within a tire. One or more contact patch parameters are determined from signal measurements or calculations related to the tire's operation within a contact patch area adjacent to a ground surface by analyzing the output of a piezoelectric sensor provided with the tire. Contact patch parameters may be obtained for one or more distinct piezoelectric elements provided within the piezoelectric sensor. Non-limiting examples of the contact patch parameters include the contact patch entry time, contact patch exit time, total contact patch time, contact patch angle, and the like. The determined tire pressure and the one or more contact patch parameters are electronically compared to a database of known values to determine a corresponding tire load value for the tire. The determined corresponding tire load value for the tire is then provided as electronic output (e.g., audio and/or visual indicators) to a vehicle operator.

Another exemplary embodiment of the present subject matter concerns a piezoelectric system for determining tire load, which may include such exemplary components as a pressure sensor, one or more piezoelectric elements, a first microprocessor, a memory for storing a look-up table, and an output device. The one or more piezoelectric elements may be configured to generate one or more respective electric signals indicative tire deformation at entry into and exit from a contact patch area present within the tire when the tire is rolling along a ground surface and supported by a load. The first microprocessor receives the electric signal from the one or more piezoelectric elements and determines one or more contact patch parameters therefrom. The memory for storing a look-up table correlates known combinations of tire pressure and contact patch parameters to tire load values such that an electronic comparison can be made of the tire pressure and the one or more contact patch parameters to the look-up table stored in memory to determine a corresponding tire load value. The output device relays the determined corresponding tire load value as electronic output (e.g., audio and/or visual output or control signal outputs).

In more particular exemplary embodiments of the above-described system, the one or more contact patch parameters determined by the first microprocessor may correspond to one or more of the contact patch entry time, contact patch exit time, total contact patch time, and/or contact patch angle. In one example, a determination of such parameters may be made by analyzing the raw piezoelectric signal directly. In another example, a determination of such parameters may be made by taking a first derivative of the piezoelectric signal and analyzing such first derivative to determine local maximum and minimum values. In another example, a determination of such parameters may be made by taking a second derivative of the piezoelectric signal and analyzing such second derivative to determine zero crossings within the second derivative.

In other more particular exemplary embodiments of the above-described system, the various electronic components are part of either an in-tire module (ITM) or a vehicle on-board system (VOS). The ITM may include, for example, the pressure sensor and optional temperature sensor, the one or more piezoelectric elements, the first microprocessor and a wireless transceiver. The related vehicle on-board system may include a wireless receiver for receiving sensor outputs and/or contact patch parameter information from ITMs respectively located in some or all tires within a vehicle. The vehicle on-board system may further include a second microprocessor, which could be used for determining some of the parameters of interest, or which could be used for storing the look-up table and implementing the comparison of determined parameters to known values to identify a corresponding tire load value.

Additional embodiments of the present subject matter, not necessarily expressed in the summarized section, may include and incorporate various combinations of aspects of features, components, or steps referenced in the summarized embodiments above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
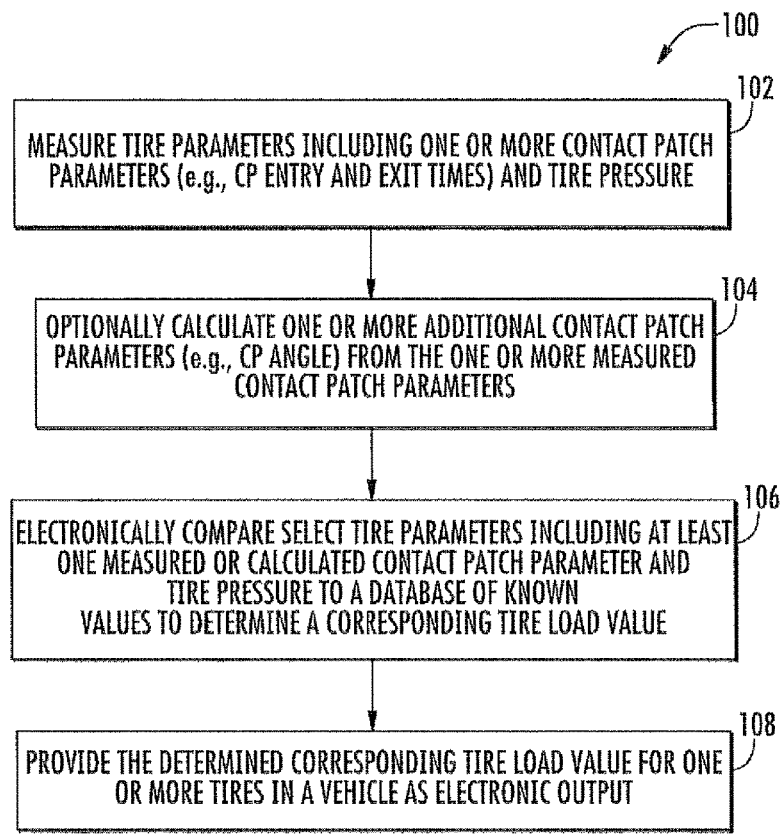
FIG. 1 provides a flow chart of exemplary steps in a method of determining tire load from one or more measured and/or calculated tire parameters.

Repeat use of reference characters throughout the present specification and appended drawings is intended to represent same or analogous features, elements or steps of the present invention.

DETAILED DESCRIPTION OF THE PREFERRED EMBODIMENTS

As discussed in the Summary of the Invention section, the present subject matter is generally concerned with features and steps for determining tire load from measured and/or calculated tire parameters. In more particular embodiments, tire load is determined from tire parameters including at least one contact patch parameter measured from one or more piezoelectric elements and tire pressure. The tire parameters may be measured and/or calculated from piezoelectric-based sensors and/or other sensors incorporated in the tire, which then can be relayed to a remote location.

Selected combinations of aspects of the disclosed technology correspond to a plurality of different embodiments of the present invention. It should be noted that each of the exemplary embodiments presented and discussed herein should not insinuate limitations of the present subject matter. Features or steps illustrated or described as part of one embodiment may be used in combination with aspects of another embodiment to yield yet further embodiments. Additionally, certain features may be interchanged with similar devices or features not expressly mentioned which perform the same or similar function.

Referring now to the drawings, FIG. 1 provides a flow chart of exemplary steps in a method 100 of determining tire load based on measured and/or calculated tire parameters. A first exemplary step 102 in method 100 involves determining tire parameters including one or more contact patch parameters as well as tire pressure. In general, contact patch parameters as referenced herein are intended to include any measurable characteristic that relates to a quantifiable parameter (e.g., timing, size, duration, frequency, angle, etc.) related to a tire's contact patch, i.e., that area of a tire that is in contact with a road surface during operation. For example, exemplary tire parameters discussed herein include but are not limited to contact patch entry time, contact patch exit time, total contact patch time, contact patch angle and the like. In some embodiments, multiple piezoelectric elements are used to measure the contact patch parameters. As discussed later in more detail, when multiple piezoelectric elements are used, a plurality of such contact patch parameter measurements may result and may be used in various combinations to determine tire load. It should be appreciated that other specific parameters related to tire operation and repeated contact with the ground at periodic locations also may be measured in step 102 and used in the disclosed methods for identifying aspects of tire performance. Tire pressure determination in step 102 may occur in a number of different ways as understood by one of ordinary skill in the art. In some examples, absolute pressure is measured directly using an absolute pressure gage provided within the tire environment. In other examples, where different non-absolute pressure measurement apparatuses are used, temperature may also be measured in addition to pressure so that the pressure reading can be suitably adjusted to provide a more accurate pressure determination.

Figure 2:
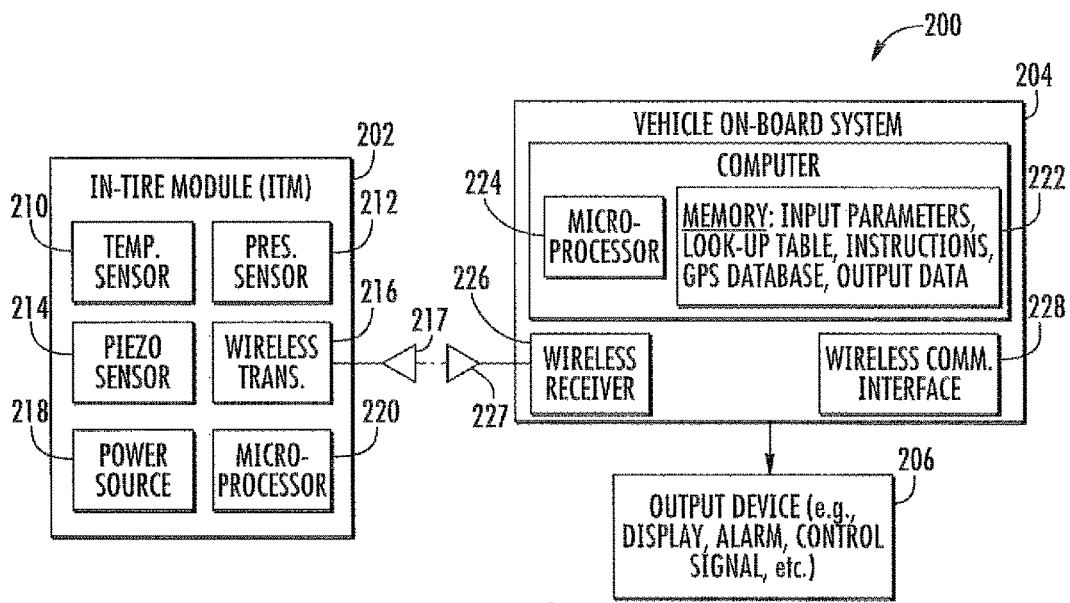
FIG. 2 illustrates an exemplary tire load determination system in accordance with the presently disclosed technology, including both hardware and software components thereof.

The various parameters measured or determined in step 102 may be obtained from a variety of one or more devices that can be included separately or as an integrated module provided within a tire. An example of a hardware device used to measure the tire parameters identified in step 102 is represented in FIG. 2 as in-tire module (ITM) 202. ITM 202 generally includes one more sensors, including a pressure sensor 212 and an optional temperature sensor used to measure pressure and also temperature if needed when pressure sensor 212 is not an absolute pressure gauge. Piezoelectric sensor 214 is also used to measure the one or more contact patch parameters, and may contain one or more distinct piezoelectric elements. It should be appreciated that different combinations of sensors may be used. For example, a single sensor could be used to obtain both temperature and pressure readings when both are needed. Additional aspects of exemplary apparatuses used to measure various tire parameters are discussed later with reference to FIGS. 3A and 3B.

Referring again to FIG. 1, a second step 104 in method 100 involves optionally calculating one or more additional contact patch parameters from the one or more measured contact patch parameters. This step is described as optional since it is possible to use the measured contact patch parameters directly to help determine tire load values. However, other embodiments of the disclosed technology use measured contact patch parameters to calculate other related contact patch parameters. The calculations determined in step 104 may occur within the ITM 202 (e.g., within microprocessor 220) or may be determined within processing components of a vehicle on-board system 204 or another remote location after being relayed from ITM 202.

Figure 4:
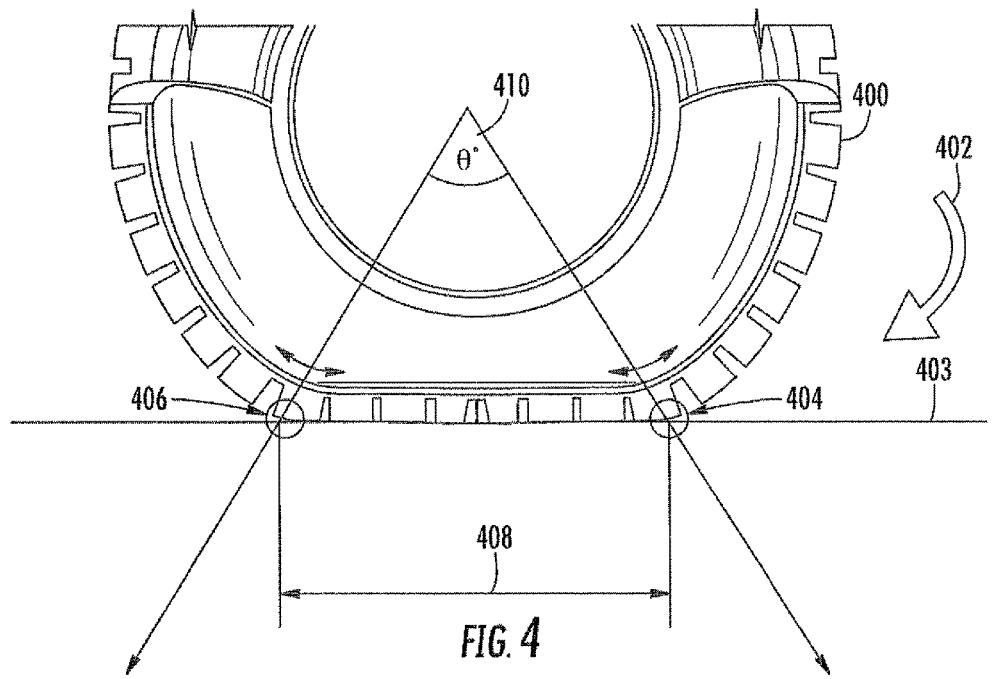
FIG. 4 illustrates a profile view of an exemplary tire portion, including aspects of a contact patch that may be used to indicate various contact patch parameters in accordance with the disclosed system and method.

In one particular embodiment, contact patch entry and exit times ($t_{cpEntry}$ and $t_{cpExit}$) are measured in step 102 and the contact patch angle ($\theta$=cpAngle) is determined from such measured contact patch parameters in step 104. An example of these parameters can be appreciated from FIG. 4. Consider in FIG. 4 that a tire 400 is rolling along a ground surface 403 in the clockwise direction as indicated by directional arrow 402. A piezoelectric sensor positioned within tire 400 can effectively determine when the sensor enters the contact patch, corresponding to contact patch entry location (cpEntry) at location 404. Similarly, a piezoelectric sensor can also effectively determine when the sensor exits the contact patch, corresponding to contact patch exit location (cpExit) at location 406. The time during which a sensor operates within a contact patch (cpTime), as represented by span 408, can thus be determined as the difference between the contact patch entry and exit times, i.e., $t_{cpTime}=t_{cpEntry}-t_{cpExit}$. Another meaningful representation of the contact patch time corresponds to the contact patch angle (cpAngle=$\theta$) represented as quantity 410 in FIG. 4.

Referring still to the electronic calculations of step 104, cpAngle can be determined from the following equation:

$$cpAngle = \frac{t_{cpExit} - t_{cpEntry}}{t_{rev}}, \qquad (1)$$

where $t_{rev}=t_{cpExit(n)}-t_{cpExit(n-1)}$ or $t_{rev}=t_{cpEntry(n)}-t_{cpEntry(n-1)}$ for each $n^{th}$ tire revolution. Tire revolutions can be counted by recognizing when a selected repeating event (e.g., either contact patch entry or contact patch exit) occurs and indexing a counter in the ITM 202 appropriately upon repeated occurrence of the selected event. The parameter $t_{rev}$ is basically a tire speed measurement, or a measurement of one revolution of the tire from a given contact patch entry to the next contact patch entry or from a given contact patch exit to the next contact patch exit. The contact patch angle (cpAngle) is also a time-based measurement corresponding to the percentage of time during a single 360 degree rotation of a tire that a sensor is within the contact patch. The contact patch angle could be represented as an angular-based measurement instead of a time-based measurement if the cpAngle value described in equation (1) is multiplied by 360 degrees.

Referring again to FIG. 1, a next step 106 in the method of determining tire load values corresponds to electronically comparing select tire parameters to a database of known values to determine a corresponding tire load value. Step 106 can occur within the tire or after the determined tire pressure and/or contact patch parameters are transmitted to a remote location relative to the tire. The select tire parameters used in the comparing step 106 include at least one measured or calculated contact patch parameter (e.g., measured parameters such as but not limited to $t_{cpEntry}$ and $t_{cpExit}$, and/or calculated values such as but not limited to $t_{cpTime}$, cpAngle, etc.) as well as tire pressure (optionally adjusted based on the temperature level if needed). In one particular example, the contact patch angle (cpAngle) and pressure are included as the select tire parameters for comparison.

Referring still to step 106, it should be appreciated that the database of known values used for comparing select tire parameters and determining a corresponding tire load can be structured in a variety of formats as understood by one of ordinary skill in the art. In one non-limiting example, a database of known values corresponds to a look-up table stored in the vehicle on-board system 204 (e.g., stored in memory 222.) The look-up table may contain different combinations of tire cpAngle values (or other contact patch parameters) and tire pressure values corresponding to different tire load values. When contact patch parameters are respectively obtained for multiple piezoelectric elements within a sensor, it should be appreciated that the look-up table may contain cpAngle values (or other contact patch parameters) for each of the multiple piezoelectric elements or some predetermined combination of the contact patch parameters from each piezoelectric element. The look-up table can include specific data points for comparison or curves generated by interpolation among the specific data points such that input parameters received from an ITM 202 can be effectively compared with the known values to determine the closest or most representative estimate of tire load. When interpolation among data points in the look-up table is implemented, it should be appreciated that any number of suitable interpolation techniques may be used, such as but not limited to linear interpolation, second-order, third-order or other forms of polynomial interpolation, spline interpolation or other suitable interpolation methods.

In some embodiments, the tire load lookup tables are generated by mounting a test tire on a wheel, rotating the tire at a range of speeds and measuring actual corresponding load values at different combinations of tire pressure and contact patch parameter values. In some embodiments, the tire load lookup tables are generated for a range of possible loads or possible combinations of contact patch and pressure parameters. For example, tire load values may be limited to a range starting from some minimum load value to some maximum load value (e.g., a load range of between about 1000 kg and 2500 kg). Establishing a minimum value for comparison purposes can be helpful because tire load accuracy determinations are sometimes affected below some minimum deflection amount. By requiring measured or calculated input parameters above a minimum level, the accuracy of tire load output determinations can be maintained.

To further ensure load determination accuracy, the tire load lookup tables may be determined while ensuring that the tires are rolling in a substantially straight direction. In other words, to determine the values for the lookup tables, the test tires are run in a manner consistent with normal highway operation and not in a manner consistent with severe vehicle turns or other complex vehicle maneuvers. It may also be preferred in some embodiments to only perform a tire load determination step 106 when the actual tire in use is operating under similar substantially symmetrical conditions.

Referring still to FIG. 1, once such estimated tire load value is determined in step 106, a subsequent step 108 involves providing the determined corresponding tire load value for one or more tires in a vehicle as electronic output for a user. The output provided in step 108 can take one or more of a variety of forms. For example, tire load output can be provided for some or all tires on a monitor or other display provided either within the vehicle on-board system or at another central data location remote from the tire(s)—e.g., at a fleet tracking center for commercial vehicles or other large equipment. In another example, tire load output can be provided in the form of alarms within a vehicle or at a remote location, including but not limited to audible alarms and/or visual alarms such as activated LEDs or the like. In a still further example, output data can be in the form of a control signal used to trigger actions such as warning message activation, emergency vehicle stops, and other actions. Numerous options are possible once the tire load value(s) are accurately calculated in accordance with the disclosed technology.

Referring now to FIG. 2, additional details are now presented relating to an exemplary system for implementing the above-described features and steps associated with determining tire load based on tire contact patch parameters and tire pressure parameters. In general, such system 200 may include three types of components, namely an in-tire module (ITM) 202, a vehicle on-board system (VOS) 204 and an output device 206. Although only one ITM 202 is shown in FIG. 2, it should be appreciated that a plurality of ITMs (e.g., one ITM 202 per tire in a vehicle) may be used such that information about multiple tires is transferred to a vehicle on-board system 204 or some other central location. Similarly, although only one output device 206 is illustrated, multiple output devices (e.g., one tire load monitor light for each tire in a vehicle or multiple types of output devices such as displays, alarms, control signals, etc.) may be employed.

Referring now to the in-tire module (ITM) component 202 of FIG. 2, such device may generally include a plurality of different sensors (e.g., temperature sensor 210, pressure sensor 212, and/or piezoelectric sensor 214), a microprocessor 220 for coordinating the data received from such sensors, a transceiver 216 and associated antenna 217 for wirelessly transmitting information from ITM 202 to a remote location and a power source 218 for providing operational energy to the various electronic components within ITM 202. The temperature and pressure sensors 210 and 212 may be a single or integrated sensor such as a transducer or the like that is employed or read periodically, for example, at a time right before the wireless transceiver 216 transmits information from ITM 202 to VOS 204. The piezoelectric sensor 214 preferably includes one or more piezoelectric elements that are configured to generate electric charge when a portion of the tire to which such piezoelectric element(s) is integrated is subjected to mechanical deformation. The electrical output of the piezoelectric sensor 214 may correspond to a continuous signal of the electrical charge output of the piezoelectric element(s), thus indicating when the tire is subjected to increased loading levels. For example, as will be discussed herein, it is possible to capture and analyze the continuous raw output signal of a piezoelectric sensor 214 in order to measure such contact patch parameters as $t_{cpEntry}$ and $t_{cpExit}$ and others.

In one example, the signals obtained by sensors 210, 212 and 214 are processed by microprocessor 210 such that a select set of information is sent via wireless transceiver 216 to a remote location such as VOS 204. For instance, the information relayed may include such values as the cpAngle (or another contact patch parameter), temperature and pressure. The cpAngle variable may correspond to an average value obtained over multiple consecutive tire revolutions (e.g., 20, 50 or 100 tire revolutions). Transmitted pressure values as well as optional temperature values also may be averaged over time or may be obtained at specific instances right before data transmission to accommodate more efficient sensor operation. In some embodiments, only portions of the raw piezoelectric signal from piezoelectric sensor 214 or timing information from such signal needed to calculate cpAngle or other contact patch parameter is sent via transceiver 216. The calculations then are made remotely from the ITM 202, for example at the processor within VOS 204.

Additional information also may be relayed by transceiver 216 as determined from the output of piezoelectric sensor 214, including but not limited to an accumulated revolution count for the tire and/or an average speed measurement for the tire. Additional information relayed by transceiver 216 may include a unique identifier for each tire (e.g., tire RFIDs). As mentioned before, it is also possible to implement the comparison of determined values to the look-up table within ITM 202 as opposed to within VOS 204.

Referring now to Vehicle On-Board System 204, such system preferably includes a wireless receiver or transceiver 226 and associated antenna 227 which is in wireless communication with one or more ITMs in a vehicle. In some embodiments, one ITM 202 is provided in each vehicle tire such that VOS 204 receives information from each tire. By encoding different tires with different identification tags and/or using known communication algorithms for coordinated communication among the different ITMs, tire-specific data can be identified and potential signal interference among multiple ITMs can be addressed. Additional wireless communication between the VOS 204 and locations other than ITMs 202 can be accommodated by a wireless communication interface 228. Wireless communication interface 228 may be capable of linking VOS 204 with a central computer for vehicle tracking, or to emergency providers or other entities using a cellular device, air-card or the like. The wireless link between antennas 217 and 227 and/or the wireless link between wireless communications interface 228 and another remote location can use a variety of different communication protocols, including but not limited to cellular or RF based transmissions, and/or particular standards such as Bluetooth, Zigbee, and WiFi protocols and others.

VOS 204 also may include a microprocessor 224 and associated memory 222 for implementing many of the software based electronic calculations and determinations described herein. It should be appreciated that both microprocessors 220 and 224 include some amount of associated memory, although the memory 222 associated with microprocessor 224 is illustrated in FIG. 2 to clarify that the memory 222 associated with VOS 204 may particularly include such items as tire input parameters received from the ITM(s) 202, a look-up table of known data values used to determine tire load from the received tire parameters, software instructions for handling tasks such as communication coordination, parameter analysis and tire load determination, as well as the output data generated from such tasks. Computing/processor device 224 may be adapted to operate as a special-purpose machine by executing the software instructions rendered in a computer-readable form stored in memory/media element 222. When software is used, any suitable programming, scripting, or other type of language or combinations of languages may be used to implement the teachings contained herein. In other embodiments, the methods disclosed herein may alternatively be implemented by hard-wired logic or other circuitry, including, but not limited to application-specific circuits.

Although only one memory element 222 is shown in FIG. 2, it should be appreciated that any number of memory or media elements may be included to store software instructions, data variables and the like. The various memory/media elements may be provided as a single or multiple portions of one or more varieties of tangible computer-readable media, such as but not limited to any combination of volatile memory (e.g., random access memory (RAM, such as DRAM, SRAM, etc.) and nonvolatile memory (e.g., ROM, flash, hard drives, magnetic tapes, CD-ROM, DVD- ROM, etc.) or any other memory devices including diskettes, drives, other magnetic-based storage media, optical storage media and others.

Referring now to output device 206, it should be appreciated that the determined output parameters, particularly tire load values determined in accordance with the present technology, may be relayed to output device 206 for meaningful electronic communication with a vehicle occupant, central control station, or other entity. In some examples, output device 206 corresponds to a monitor or other visual display within the vehicle, a sensor or alarm, or other device capable of generating an audio and/or visual representation of the specific tire load value or comparison of the tire load to some threshold level(s). In other examples, output devices such as printers or controllers also may be employed.

Figure 3A:
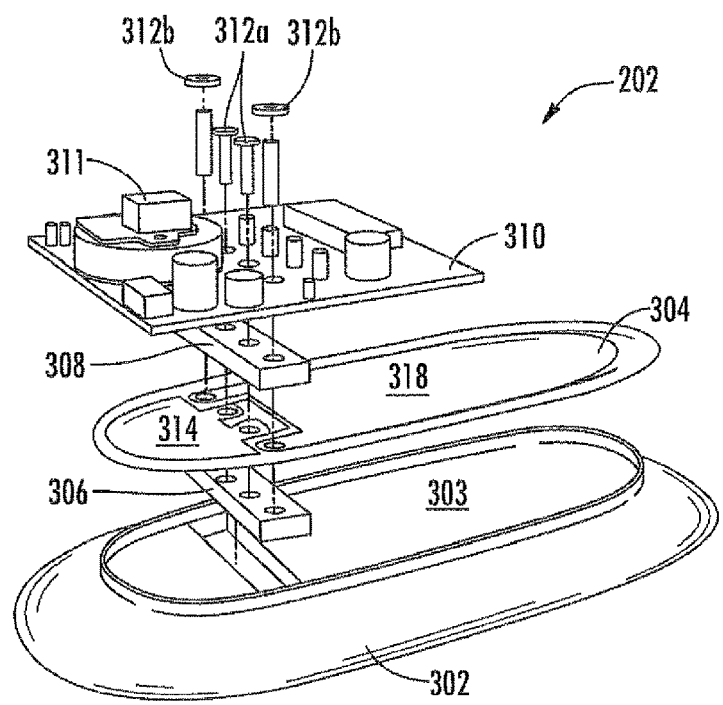
FIG. 3A illustrates a perspective view of an exemplary in-tire module (ITM) for use in a tire load determination system of the present technology.

Referring now to FIG. 3A, more particular structural details of an exemplary ITM are now presented. In one exemplary embodiment, ITM 202 includes such structural elements as a support patch 302, a piezoelectric patch 304, first and second spacer bars 306 and 308, an electronics substrate 310 and a plurality of electromechanical connections 312.

The support patch 302 may correspond to a substantially planar portion of rubber or other elastomeric material. Support patch 302 offers modular structure for ITM 202 and also provides a base for suitable integration with the interior surface of a tire. For example, the support patch 302 may be attached to or integrated with or embedded on the inner surface or inner liner of a tire using adhesives, curing techniques, or other suitable means. Although ITM 202 may be positioned at a variety of locations within the tire where the piezoelectric elements will be subjected to various tire stress levels, some examples use a mounting location of ITM 202 in the center of the tire crown, i.e., along a lateral centerline of the tire width. Support patch 302 along with piezoelectric pack 304 may be formed with surfaces having minimized curvatures to help avoid local fatigue within an ITM 202.

Support patch 302 may or may not include an embedded portion 303 as illustrated in FIG. 3 along an upper surface of the support patch for receiving other hardware features of the ITM 202. In one example, recessed portion 303 formed within support patch 302 is configured to receive a first spacer bar 306 as well as the piezoelectric pack 304. A second spacer bar 308 then may be provided above the piezoelectric pack 304 between the piezoelectric pack 304 and an electronics substrate 310. Further connection between select components such as between the support patch 302, piezoelectric pack 304 and first spacer bar 306 may be formed with additional adhesive materials, such as but not limited to a polymer-based coating material such as Chemlock®.

Spacer bars 306 and 308 provide insulation among the various electronic modules within ITM 202, but also respectively include a plurality of openings therein which form orthogonal connection lines among such components. Such connection lines may be enhanced by providing conductive linings or inserts within selected openings. The electromechanical connectors 312 then can be fed through the openings formed within spacer bars 306 and 308 as well as within electronics substrate 310 and piezoelectric pack 304 to form selective electrical connection with the electronic components and overall structural connections for the assembled module. For example, the inner threaded posts 312a may be configured to connect to a first piezoelectric element 314 used for measuring contact patch parameters or other information generated by piezoelectric sensor 214. The outer threaded posts 312b may be configured to connect to a second piezoelectric element 318 used for power generation to help operate the various electronic components within the ITM 202.

Piezoelectric pack 304 may correspond to a substrate surface on which one or more piezoelectric elements are formed. In one example, a first piezoelectric element 314 formed on the substrate surface of piezoelectric pack 304 is provided to function as piezoelectric sensor 214, while a second piezoelectric element 318 is formed on the substrate surface of piezoelectric pack 304 to function as power source 218. The electric current generated by such second piezoelectric element 318 may be conditioned and stored within a rechargeable battery, capacitor or other energy source, which then can be coupled to such electronic components as temperature sensor 210, pressure sensor 212, microprocessor 220, and/or transceiver 216 to supply operating power thereto.

First and second piezoelectric elements may correspond to a variety of piezoelectric structures, including but not limited to piezoelectric crystals, composite fiber structures, piezoceramic modules, or other devices made out of piezoelectric material. The piezoelectric material used in such elements may include one or more of berlinite, quartz, topaz, tourmaline-group minerals, dentin, gallium orthophosphate, langasite, barium titanate, lead titanate, lead zirconate titanate (PZT), potassium niobate, lithium niobate, lithium tantalite, sodium tungstate, sodium potassium niobate, bismuth ferrite, sodium niobate, and polyvinylidene fluoride (PVDF). In some specific embodiments, each piezoelectric element is formed from a single layer of piezoceramic material sandwiched between opposing layers of electrode material (e.g., a conductive material such as copper, nickel, gold, silver, aluminum or the like.) The multiple piezoelectric elements may all be encased in an additional protective material, such as a thin casing of fiberglass on the top and bottom of the piezoelectric elements.

In some embodiments, the second piezoelectric element 318 used for power generation is larger than the first piezoelectric element 314 used as a sensor. In some embodiments, the size of and materials used in first piezoelectric material are chosen to yield an independent power element capable of providing at least 100 µJ/cycle of electric energy during tire operation. In general, it is particularly advantageous to include two separate piezoelectric elements so that the piezoelectric element used for contact patch parameter measurement and other sensor-based information can be independent and avoid interference caused by simultaneous energy harvesting on the same piezoelectric element. Such interference can be particularly unpredictable based on unpredictable charge states of an energy storage device associated with the piezoelectric energy harvesting components. As such, separation of piezoelectric elements has resulted in enhanced signal quality and improved sensor results.

Figure 3B:
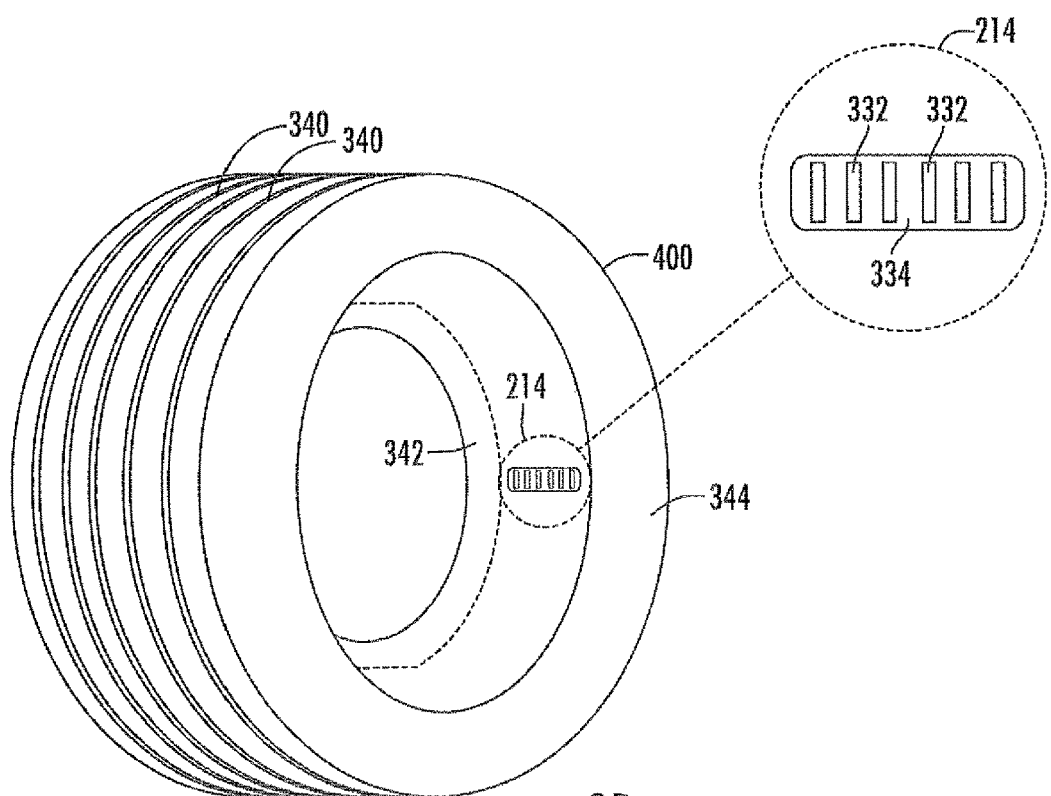
FIG. 3B illustrates an exemplary multi-element piezoelectric sensor for use in an in-tire module (ITM) in accordance with the presently disclosed technology.

Referring now to FIG. 3B, it should be appreciated that some embodiments of piezoelectric sensor 214 may include a plurality of piezoelectric elements 332. For ease of illustration, FIG. 3B shows only the piezoelectric sensor portion 214 of an ITM 202, both in its ultimate location relative to the interior surface of a tire 400, and also in an isolated magnified view. In such example, the plurality of piezoelectric elements 332 are arranged in a substantially linear array on a substrate 334. The mounting location of the piezoelectric sensor 214 within a tire 400 may be such that the linear arrangement of piezoelectric elements stretches laterally, or transverse, along the interior surface of the tire crown from a location towards a first sidewall 342 of tire 400 to a location towards a second sidewall 344. In some embodiments, the piezoelectric sensor is centered along the crown of the tire. Although six piezoelectric elements 332 are shown in FIG. 3B, it should be appreciated that any number of piezoelectric elements may be provided, for example a number of piezoelectric elements within a range from between two to ten (2-10).

In some embodiments, one or more piezoelectric elements 332 are provided to match up with selected tread ribs 340 or other tread features, such that the load experienced by each tread rib or tread feature along the entire contact patch area can be determined. In some embodiments, piezoelectric sensor 214 is configured such that one piezoelectric element 332 is positioned on the interior surface of a tire underneath each respective tread rib or feature provided along a portion of the tire exterior (e.g., only the tread ribs or features within the tire crown portion, not the tire sidewall portions). In other embodiments, piezoelectric elements 332 are provided at every other tread rib/feature or at other selected combinations of tread ribs/features. In still further embodiments, piezoelectric elements 332 are provided at spaced intervals having some predetermined distance from adjacent piezoelectric elements. In other embodiments, the piezoelectric elements may be configured in non-linear arrays or matrix configurations (e.g., 2×2, 2×3, 2×6, 3×9, etc.)

By providing multiple piezoelectric elements, more information about the contact patch area and ultimate load determination can be identified since the contact patch length at multiple locations across the lateral span of the tire can be determined. This combination of multiple contact patch lengths provides sufficient information to be representative of the contact patch area, which may vary laterally across the tire. As such, it can sometimes provide a more detailed and accurate representation of the contact patch area in order to more effectively determine the load levels for a tire.

Figure 6:
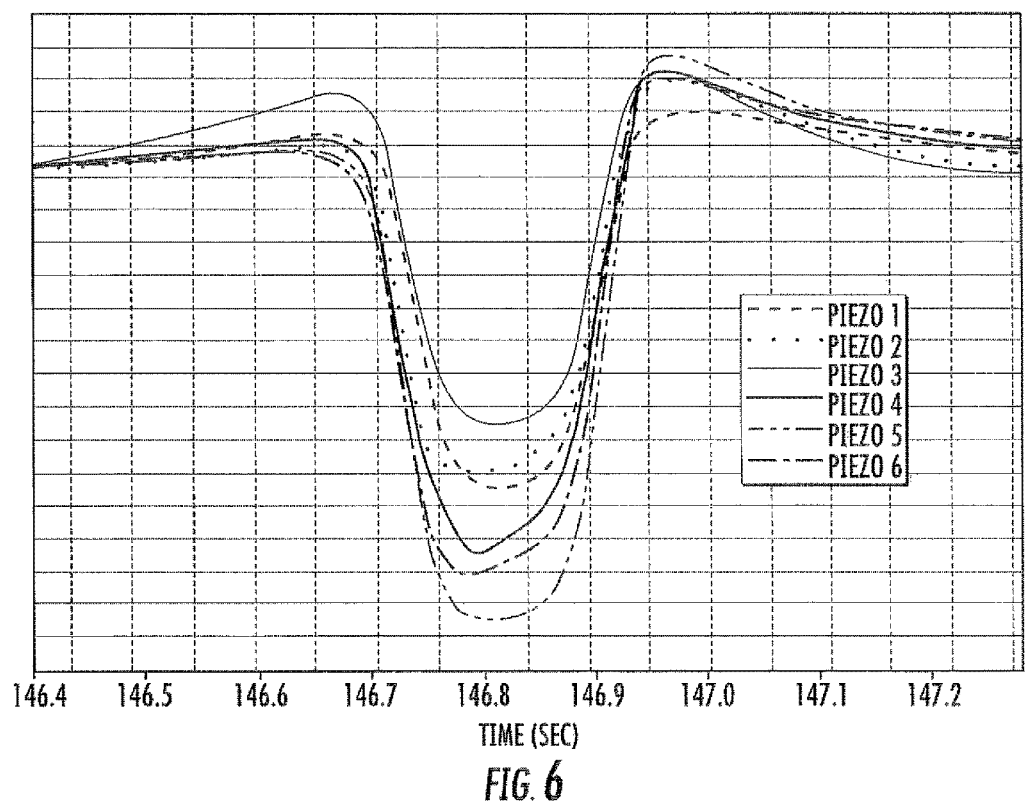
FIG. 6 provides an exemplary graphical representation of exemplary output signals from a multi-element piezoelectric sensor used in an in-tire module for obtaining contact patch parameters in accordance with aspects of the disclosed technology.
Figure 5:
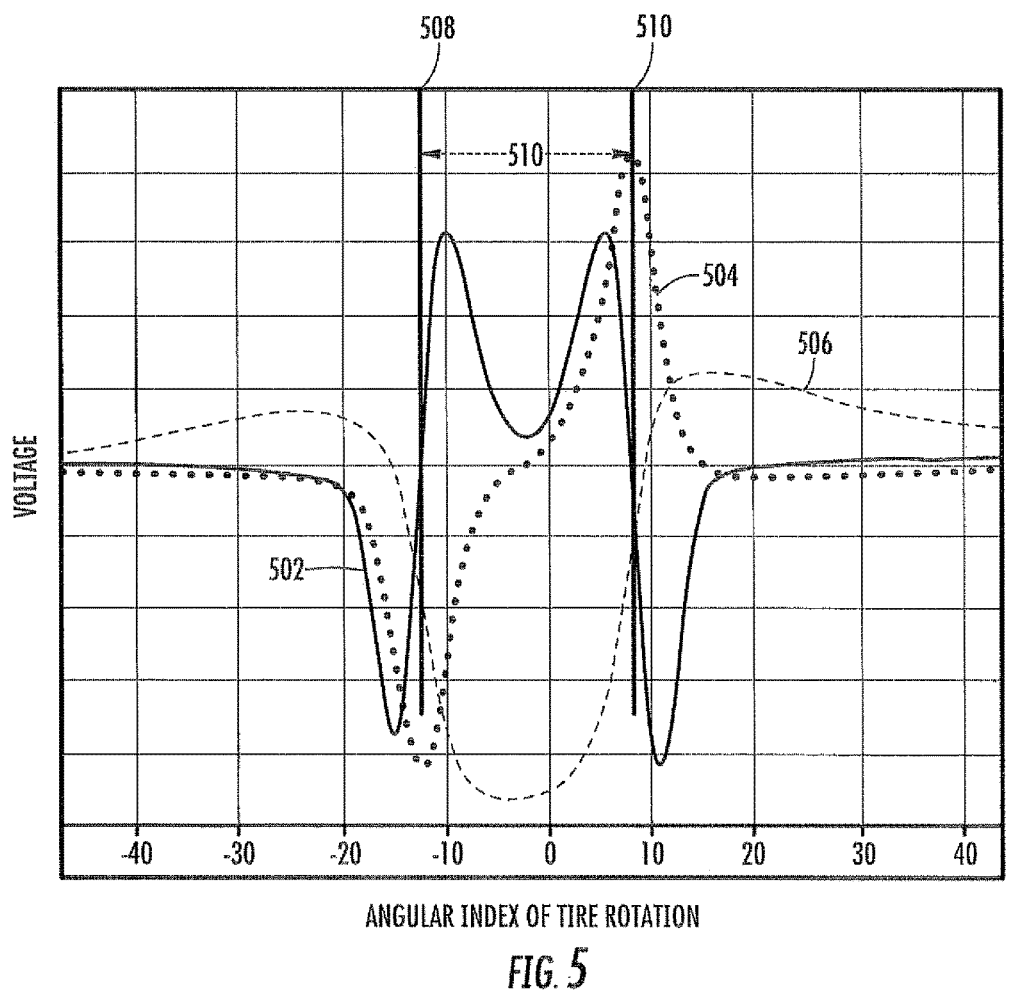
FIG. 5 provides an exemplary graphical representation of exemplary output signals and corresponding derivative signals from a piezoelectric sensor used in an in-tire module (ITM) for obtaining contact patch parameters in accordance with aspects of the disclosed technology.

Additional details regarding the output of each piezoelectric element used in the disclosed technology, particularly the piezoelectric element used as a sensor for determining the subject contact patch parameters, are now presented with respect to FIGS. 5 and 6. The piezoelectric element used as a sensor in the disclosed technology generates a voltage proportional to the time-varying shape of the tire where it is attached. When the tire is rolling, the rate of change of the piezoelectric stress is greatest where the tire curvature change is greatest, namely at the leading and trailing edges of the contact patch. The voltage signal corresponding to this time-varying stress is positive or negative depending on the particular polarization of the piezoelectric material. Regardless of polarity, the raw piezoelectric output signal will exhibit a reversal of voltage rate correlating to the reversal of the time-varying applied stress exerted at the piezoelectric element. For example, if tensile stress within the piezoelectric material generates a positive voltage, then the release of that tensile stress or application of compressive stress along the same axis would generate a negative voltage.

It is possible to analyze the piezoelectric sensor output in a variety of fashions in order to determine the subject contact patch parameters (e.g., one or more of the contact patch entry time, contact patch exit time, total contact patch time and/or contact patch angle—all of which either correspond to or depend from the contact patch exit and/or entry times.) For example, it is possible to determine such values directly from the raw piezoelectric signal, which is illustrated as the solid line 502 in FIG. 5. For instance, such signal could be determined to be within the contact patch when the output voltage level is above or below some predetermined threshold value. This total contact patch time (cpTime) is represented as signal portion 512 in FIG. 5, or the time duration between contact patch entry time ($t_{cpEntry}$) at point 508 and contact patch exit time ($t_{cpExit}$) at point 510. The raw piezoelectric signals simultaneously obtained from respective piezoelectric elements when multiple piezoelectric elements are provided within a piezoelectric sensor may look similar to the exemplary graph provided in FIG. 6.

In other examples, the contact patch parameters, particularly the azimuths corresponding to the contact patch entry and exit times 508 and 510 can be determined from the first or second derivates of the raw piezoelectric signal. The dotted line 504 in FIG. 5 represents the first derivative of the raw piezoelectric signal 502. As evident from the graphical representation, the local maximum and minimum values of the first derivative signal 504 correspond to the contact patch entry and exit times, respectively. Such times can also be determined from the second derivative of the raw piezoelectric signal, which is illustrated in FIG. 5 as dashed line 506. As evident from this graphical representation, the zero-crossing times of the second derivative signal 506 correspond to the contact patch entry and exit times, respectively.

Although some embodiments of the disclosed technology may use only one of the above signal analysis techniques for determining the desired contact patch parameters, multiple forms of analysis (e.g., analysis of both the first and second derivatives or analysis of the raw signal plus one or more derivatives, etc.) can be used to help minimize error in the piezoelectric signal analysis and contact patch parameter determination.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method of electronically determining tire load, comprising:
   determining tire pressure within a tire using a pressure sensor that is part of an in tire module mounted on the tire;
   determining a contact patch angle related to the tire's operation within a contact patch area adjacent to a ground surface by analyzing an output of a piezoelectric sensor provided as part of the in tire module mounted on the tire, the contact patch angle indicative of an angular portion of the tire that is in contact with the ground surface;
   electronically comparing the determined tire pressure and the one or more contact patch parameters to a database of known values to determine a corresponding tire load value for the tire; and
   providing the determined corresponding tire load value for the tire as electronic output,
   wherein determining the contact patch angle for a given iteration of the piezoelectric sensor traveling through the contact patch area comprises subtracting a contact patch exit time from a contact patch entry time to obtain a first difference; obtaining a second difference by measuring an amount of time for one revolution of the tire; and dividing the first difference by the second difference.

2. The method of claim 1, wherein the one or more contact patch parameters comprise a plurality of contact patch parameters respectively associated with a plurality of piezoelectric elements provided within the piezoelectric sensor.

3. The method of claim 1, wherein said one or more contact patch parameters comprises one or more of a contact patch entry time, contact patch exit time, total contact patch time and contact patch angle.

4. The method of claim 1, wherein the tire pressure is determined using an absolute pressure gauge.

5. The method of claim 1, wherein determining tire pressure comprises determining absolute tire pressure by measuring both pressure and temperature within a tire.

6. The method of claim 1, further comprising a step of transmitting the tire pressure and the one or more contact patch parameters to a location remote from the tire.

7. The method of claim 1, further comprising a step of providing operational power for various electronic components within the tire from a separate piezoelectric element than the piezoelectric sensor.

8. A piezoelectric system for determining tire load within a tire, comprising:
   a sensor configured to measure tire pressure;
   a plurality of piezoelectric elements configured to generate one or more respective electric signals indicative of tire deformation at entry into and exit from a contact patch area present within the tire when the tire is rolling along a ground surface and supporting a load;
   a first microprocessor for receiving the electric signal output from said plurality of piezoelectric elements and determining one or more contact patch parameters, wherein the one or more contact patch parameters comprise an interpolation of data points obtained across the plurality of piezoelectric elements;
   a memory for storing a look-up table correlating known combinations of tire pressure and contact patch parameters to tire load values such that an electronic comparison can be made of the tire pressure and the one or more contact patch parameters to the look-up table stored in memory to determine a corresponding tire load value; and
   an output device for relaying the determined corresponding tire load value as electronic output
   wherein the plurality of piezoelectric elements are provided to match up with selected tread ribs for determining the load experienced by each of the selected tread ribs along the contact patch area; wherein said plurality of piezoelectric elements are configured in a linear array with selected piezoelectric elements aligned relative to selected tread ribs of a tire.

9. The piezoelectric system of claim 8, further comprising an additional piezoelectric element used for generating power for selected electronic components within the piezoelectric system such that none of the one or more piezoelectric elements configured to generate one or more respective electric signals indicative of tire deformation is used for power generation within the tire.

10. The piezoelectric system of claim 8, wherein said system comprises an in-tire module containing said sensor configured to measure tire pressure and said one or more piezoelectric elements.

11. The piezoelectric system of claim 10, wherein said in-tire module contains said first microprocessor and a wireless transceiver.

12. The piezoelectric system of claim 10, wherein said system comprises a vehicle on-board system configured to wirelessly receive the tire pressure and the one or more contact patch parameters for a plurality of tires within a vehicle.

13. The piezoelectric system of claim 12, wherein said vehicle on-board system comprises said memory for storing a look-up table and a second microprocessor communicatively coupled to said memory and configured to implement the electronic comparison of tire pressure and the one or more contact patch parameters to the look-up table stored in memory to determine a corresponding tire load value.

14. The piezoelectric system of claim 8, wherein said one or more contact patch parameters comprises one or more of a contact patch entry time, contact patch exit time, total contact patch time and contact patch angle for each of said one or more piezoelectric elements.

* * * * *